United States Patent
Sargeant et al.

(10) Patent No.: US 9,292,570 B2
(45) Date of Patent: *Mar. 22, 2016

(54) SYSTEM AND METHOD FOR OPTIMIZING PATTERN QUERY SEARCHES ON A GRAPH DATABASE

(71) Applicant: Northrop Grumman Systems Corporation, Falls Church, VA (US)

(72) Inventors: Daniel Sargeant, Austin, TX (US); Morgan Hollinger, Cedar Park, TX (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 89 days.

This patent is subject to a terminal disclaimer.

(21) Appl. No.: 13/856,960

(22) Filed: Apr. 4, 2013

(65) Prior Publication Data

US 2013/0226893 A1 Aug. 29, 2013

Related U.S. Application Data

(63) Continuation of application No. 12/950,582, filed on Nov. 19, 2010, now Pat. No. 8,433,701.

(60) Provisional application No. 61/262,917, filed on Nov. 19, 2009.

(51) Int. Cl.
  *G06F 17/30* (2006.01)

(52) U.S. Cl.
  CPC .... *G06F 17/30442* (2013.01); *G06F 17/30451* (2013.01); *G06F 17/30958* (2013.01); *G06F 17/30286* (2013.01); *G06F 17/30595* (2013.01); *G06F 17/30864* (2013.01)

(58) Field of Classification Search
  None
  See application file for complete search history.

(56) References Cited

U.S. PATENT DOCUMENTS

| | | | |
|---|---|---|---|
| 6,556,983 B1 * | 4/2003 | Altschuler et al. | 706/55 |
| 8,069,188 B2 * | 11/2011 | Larson et al. | 707/802 |
| 8,515,983 B1 * | 8/2013 | Snyder et al. | 707/760 |
| 2004/0220923 A1 * | 11/2004 | Nica | 707/3 |
| 2006/0265697 A1 * | 11/2006 | Ali et al. | 717/141 |
| 2007/0208693 A1 * | 9/2007 | Chang et al. | 707/2 |
| 2007/0226796 A1 * | 9/2007 | Gilbert et al. | 726/22 |
| 2007/0239694 A1 * | 10/2007 | Singh et al. | 707/3 |
| 2010/0114629 A1 * | 5/2010 | Adler et al. | 705/7 |
| 2011/0004581 A1 * | 1/2011 | Schmidt et al. | 706/55 |

OTHER PUBLICATIONS

Angela I. Maduko, Graph Summaries for Optimizing Graph Pattern Queries on RDF Databases, May 2009.

* cited by examiner

*Primary Examiner* — Dung K Chau
(74) *Attorney, Agent, or Firm* — Andrews Kurth LLP; Sean S. Wooden

(57) ABSTRACT

An embodiment of the system and method for optimizing pattern query searches on a graph database uses a pattern query optimizer to optimize execution of the search plan for any sequence of SQL expressions by separating or breaking a pattern query into multiple subpattern queries before converting the subpattern queries into SQL expressions. An embodiment of the pattern query optimizer algorithmically, without intervention by an analyst, decomposes any pattern query into a set of subpattern queries by first identifying branches and cycles within a pattern query and then decomposing each identified branch and cycle into equivalent straight line paths, i.e., straight line nodes joined by edges. Cardinality may be used to improve the performance of pattern searches.

16 Claims, 9 Drawing Sheets

SYSTEM AND METHOD FOR OPTIMIZING PATTERN QUERY SEARCHES ON A GRAPH DATABASE

RELATED APPLICATION

This application is a continuation application of U.S. Patent Application Serial No. 12/950,582, filed Nov. 19, 2010, which claims the priority of U.S. Provisional Application Serial No. 61/262,917, entitled "Pattern Query Optimizer and Method of Using Same", filed Nov. 19, 2009, both of which are hereby incorporated herein by reference in their entirety.

APPENDIX

Appendix A contains source code for an exemplary implementation of an embodiment of a pattern query language (PQL) parser and lexer.

BACKGROUND

In a database management system, a graph has one or more nodes (or vertices) that are connected by one or more edges (or links). Each node may have a type or class and at least one value associated with it. A graph database refers to a collection of data that is stored in a graph data structure implemented in a database management system.

Analysts often have the need to look for patterns in data that can be represented as subgraphs. Using a pattern as a query mechanism is called subgraph isomorphism, graph pattern matching, or pattern query.

To reduce the search time needed for a particular pattern query, it may be desirable to produce an optimal deconstruction of the pattern query. Currently, such deconstruction is accomplished through a combination of visual inspection, experience, experimentation, or other techniques. However, such ad hoc approaches are not practical for complex pattern query searches. For example, although visual cues may be evident from the visual depiction of the pattern, in practice many pattern queries are prepared in pattern query language (PQL) and the PQL representation of the pattern query does not provide such visual cues. Also, it is not desirable to require an analyst to have expertise in query plan optimization.

DETAILED DESCRIPTION

Figure 1:
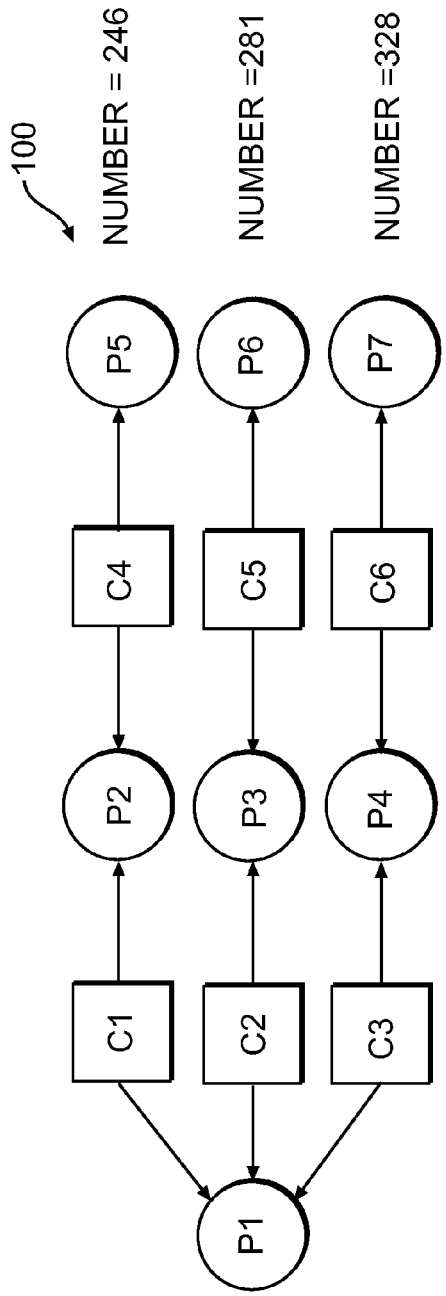
FIG. 1 illustrates an exemplary pattern query.

An embodiment of a system and method optimizes pattern query searches on a graph database. An embodiment of the system and method may be implemented in, for example, 21st Century Technologies' LYNXeon Server™ and LYNXeon Analyst Studio™. The LYNXeon Server enables the ingest of existing databases, graph storage, search and sophisticated analytics, including graph pattern search capabilities that use an embodiment of a pattern query language (PQL) to express link-oriented queries. The LYNXeon Analyst Studio is a workstation tool for accessing the LYNXeon Server platform (i.e., the "LYNXeon platform"). Embodiments of the LYNXeon platform may use a structured query language (SQL)-compliant object-relational database management system, such as PostgreSQL, to provide persistent storage for node and edge data of a graph database.

Appendix A contains source code for an exemplary implementation of a PQL parser and lexer for expressing graph pattern searches. Additional description of embodiments of the LYNXeon platform, including an exemplary graph schema parser and lexer and graph normal form schema generator, can be found in U.S. patent application Ser. No. 11/590,070, entitled "Segment Matching Search System and Method," filed on Oct. 30, 2006, and incorporated herein by reference in its entirety.

An embodiment of the LYNXeon platform may implement graph pattern matching and other operations on a graph as Java operations on graph elements stored in a memory. The main data structure is a tuple table. The tuple table includes tuple columns. Each tuple column in the tuple table stores candidates for a specific node in the graph pattern. The tuple columns are filled from left to right as segments are matched as part of the graph pattern matching. A segment, in current embodiments, has two nodes and an edge. In embodiments, each row in the tuple table contains node IDs for a single pattern match. Tuple columns may use two main operation types: streaming and filtering. A streaming operation fills a column with new candidate nodes. All columns except the first may be populated as a function of previous columns. For example, a tuple column may be populated based on the existence of edges between new candidates and candidates in a previous column. A filtering operation removes candidates from a tuple column that do not meet any additional pattern constraints, such as candidates that do not have an edge between the candidates and another node in the match, candidates that are not distinct from other nodes in the match, or candidates that do not meet attribute constraints. In embodiments, the tuple table holds a subset of all potential matches in the memory. Those of ordinary skill in the art will appreciate that the amount of available memory constrains the effective size of the graph database and the performance of pattern searches.

An embodiment of a system and method for optimizing pattern query searches on a graph database provides improvements to the pattern query algorithm of an embodiment of the LYNXeon platform. An embodiment of the system and method implement graph pattern matching by translating PQL statements into a planned sequence of SQL operations (i.e., SQL commands, SQL expressions, and SQL statements). An embodiment of the system and method may decrease execution time of pattern searches by overcoming inefficiencies and pathological cases incurred by relying exclusively on database planner translations and the search methodologies of the current embodiment of the LYNXeon platform.

FIG. 1 illustrates an exemplary pattern query 100 of a graph database. A pattern query (i.e., query or search pattern) may be expressed in PQL and input into a graph database platform 60 (shown in FIG. 8) by an analyst or by another system. The PQL-expressed query may be fed into a search pattern compiler 64 (shown in FIG. 8) and the search pattern compiler 64 may generate a search plan (i.e., query plan) from the PQL-expressed query. In an embodiment the graph database is implemented in a PostgreSQL database and the search plan includes one or more SQL expressions.

When a pattern contains branches or cycles, search performance degrades sharply compared to the case where the pattern is a straight line path, i.e., straight line nodes joined by edges. A branch is a path within the graph in which all nodes but the end node of the path have a degree of two in the graph. For example, in the pattern query 100 of FIG. 1, seven persons (type P) are attached by six phone calls (type C). P1 is the end node of a branch (also referred to as a branch node). A cycle is a connected subgraph having at least three edges and no duplicated nodes (except for the start/end node). For example, a pattern query 600 shown in FIG. 6 includes several cycles, including the paths P1-C1-P2-C4-P5-C5-P3-C2-P1 and P5-C6-P4-C3-P1-C1-P2-C4-P5. Every node in a cycle is adjacent (i.e., connected by an edge) to two other nodes also in the cycle. Because streaming may depend on previous columns, an analyst may need to choose a single root node and traverse the graph from the single root node. Each newly visited node may need to be directly connected to at least one previously visited node. This restriction prevents the analyst from minimizing the search space.

For example, the pattern query 100 shown in FIG. 1 represents a pathological case for the current LYNXeon platform. The following is an exemplary PQL-expressed query for the search plan generated by the current LYNXeon platform for the pattern query 100 of FIG. 1.

```
search droppedPhone is
    instance p1 : PhoneNumber;
    instance p2 : PhoneNumber;
    instance p3 : PhoneNumber;
    instance p4 : PhoneNumber;
    instance p5 : PhoneNumber where number = 246;
    instance p6 : PhoneNumber where number = 281;
    instance p7 : PhoneNumber where number = 328;
    instance c1 : PhoneCall;
    instance c2 : PhoneCall;
    instance c3 : PhoneCall;
    instance c4 : PhoneCall;
    instance c5 : PhoneCall;
    instance c6 : PhoneCall;
    connections
        c1.fromNumber connects p1;
        c1.toNumber connects p2;
        c2.fromNumber connects p1;
        c2.toNumber connects p3;
        c3.fromNumber connects p1;
        c3.toNumber connects p4;
        c4.fromNumber connects p2;
        c4.toNumber connects p5;
        c5.fromNumber connects p3;
        c5.toNumber connects p6;
        c6.fromNumber connects p4;
        c6.toNumber connects p7;
        distinct PhoneNumber {
            p2, p3, p4
        };
    end
    export
        p1 is p1.number;
        p2 is p2.number;
        p3 is p3.number;
        p4 is p4.number;
        p5 is p5.number;
        p6 is p6.number;
        p7 is p7.number;
    end
end
```

The following shows exemplary SQL expressions generated by the PQL-expressed query shown above.

```
CREATE TEMP TABLE droppedPhone_path1 AS
SELECT DISTINCT
    c2_fromNumber_p1.destinationId AS p1,
    c2_toNumber_p3.destinationId AS p3,
    c5_toNumber_p6.destinationId AS p6
FROM
    --Attribute Tables--
    "VAST2008"."GNF_PhoneNumber" p6_tbl,
    --Relation Tables--
    "VAST2008"."GNF_PhoneCall_relations" c2_toNumber_p3,
    "VAST2008"."GNF_PhoneCall_relations" c2_fromNumber_p1,
    "VAST2008"."GNF_PhoneCall_relations" c5_fromNumber_p3,
    "VAST2008"."GNF_PhoneCall_relations" c5_toNumber_p6
WHERE
    --Node Qualifiers--
    p6_tbl.number = 281 AND
    --Edge Contraints--
    c5_toNumber_p6.relationshipId = 10 AND
    c5_fromNumber_p3.relationshipId = 8 AND
    c2_toNumber_p3.relationshipId = 10 AND
    c2_fromNumber_p1.relationshipId = 8 AND
    --Table Joins--
    c2_toNumber_p3.destinationId =
    c5_fromNumber_p3.destinationId
    AND
    c2_toNumber_p3.sourceId = c2_fromNumber_p1.sourceId AND
    c5_toNumber_p6.destinationId = p6_tbl.UID AND
    c5_fromNumber_p3.sourceId = c5_toNumber_p6.sourceId;
CREATE TEMP TABLE droppedPhone_path0 AS
SELECT DISTINCT
    c1_fromNumber_p1.destinationId AS p1,
    c4_fromNumber_p2.destinationId AS p2,
    c4_toNumber_p5.destinationId AS p5
FROM
    --Attribute Tables--
    "VAST2008"."GNF_PhoneNumber" p5_tbl,
    --Relation Tables--
    "VAST2008"."GNF_PhoneCall_relations" c4_fromNumber_p2,
    "VAST2008"."GNF_PhoneCall_relations" c1_toNumber_p2,
    "VAST2008"."GNF_PhoneCall_relations" c1_fromNumber_p1,
    "VAST2008"."GNF_PhoneCall_relations" c4_toNumber_p5
WHERE
    --Node Qualifiers--
    p5_tbl.number = 246 AND
    --Edge Contraints--
    c4_toNumber_p5.relationshipId = 10 AND
    c4_fromNumber_p2.relationshipId = 8 AND
    c1_fromNumber_p1.relationshipId = 8 AND
    c1_toNumber_p2.relationshipId = 10 AND
    --Table Joins--
    c4_fromNumber_p2.sourceId = c4_toNumber_p5.sourceId AND
    c4_toNumber_p5.destinationId = p5_tbl.UID AND
    c1_toNumber_p2.sourceId = c1_fromNumber_p1.sourceId AND
    c4_fromNumber_p2.destinationId = c1_toNumber_p2.destinationId;
CREATE TEMP TABLE droppedPhone_path2 AS
```

-continued

```
SELECT DISTINCT
   c3_fromNumber_p1.destinationId AS p1,
   c6_fromNumber_p4.destinationId AS p4,
   c6_toNumber_p7.destinationId AS p7
FROM
   --Attribute Tables--
   "VAST2008"."GNF_PhoneNumber" p7_tbl,
   --Relation Tables--
   "VAST2008"."GNF_PhoneCall_relations" c6_fromNumber_p4,
   "VAST2008"."GNF_PhoneCall_relations" c6_toNumber_p7,
   "VAST2008"."GNF_PhoneCall_relations" c3_toNumber_p4,
   "VAST2008"."GNF_PhoneCall_relations" c3_fromNumber_p1
WHERE
   --Node Qualifiers--
   p7_tbl.number = 328 AND
   --Edge Contraints--
   c3_fromNumber_p1.relationshipId = 8 AND
   c3_toNumber_p4.relationshipId = 10 AND
   c6_toNumber_p7.relationshipId = 10 AND
   c6_fromNumber_p4.relationshipId = 8 AND
   --Table Joins--
   c3_toNumber_p4.sourceId = c3_fromNumber_p1.sourceId AND
   c6_fromNumber_p4.sourceId = c6_toNumber_p7.sourceId AND
   c6_toNumber_p7.destinationId = p7_tbl.UID AND
   c6_fromNumber_p4.destinationId =
   c3_toNumber_p4.destinationId;
      SELECT DISTINCT
         p1_tbl.number AS p1,
         p2_tbl.number AS p2,
         p3_tbl.number AS p3,
         p4_tbl.number AS p4,
         p5_tbl.number AS p5,
         p6_tbl.number AS p6,
         p7_tbl.number AS p7
      FROM
         --Attribute Tables--
         "VAST2008"."GNF_PhoneNumber" p2_tbl,
         "VAST2008"."GNF_PhoneNumber" p6_tbl,
         "VAST2008"."GNF_PhoneNumber" p5_tbl,
         "VAST2008"."GNF_PhoneNumber" p3_tbl,
         "VAST2008"."GNF_PhoneNumber" p1_tbl,
         "VAST2008"."GNF_PhoneNumber" p7_tbl,
         "VAST2008"."GNF_PhoneNumber" p4_tbl,
         --Path Tables--
         droppedPhone_path1,
         droppedPhone_path0,
         droppedPhone_path2
      WHERE
         --Table Joins--
         droppedPhone_path1.p3 = p3_tbl.UID AND
         droppedPhone_path2.p7 = p7_tbl.UID AND
         droppedPhone_path2.p4 = p4_tbl.UID AND
         droppedPhone_path1.p6 = p6_tbl.UID AND
         droppedPhone_path0.p5 = p5_tbl.UID AND
         droppedPhone_path0.p1 = p1_tbl.UID AND
         droppedPhone_path0.p2 = p2_tbl.UID AND
         --Pattern Constraints--
         droppedPhone_path0.p1 = droppedPhone_path1.p1 AND
         droppedPhone_path0.p1 = droppedPhone_path2.p1 AND
         droppedPhone_path0.p2 != droppedPhone_path1.p3 AND
         droppedPhone_path0.p2 != droppedPhone_path2.p4 AND
         droppedPhone_path1.p3 != droppedPhone_path2.p4;
```

Referring again to FIG. 1, a search using the pattern query 100 may visit the nodes in the following order: P1, C1, C3, P2, P4, C4, C6, C2, P3, C5, P5, P6, P7. A qualified node is a node with a value qualifier on this node. Among the nodes shown in FIG. 1, P5, P6, and P7 are qualified nodes (e.g., P5 is qualified by "number=246," P6 is qualified by "number=281," and P7 is qualified by number=328"). The qualified nodes (e.g., P5, P6, and P7) may not be considered until the end. A constrained node is a node that compares two or more nodes against each other. Referring again to FIG. 1, P5, P6, and P7 (e.g., the leaf persons) are constrained nodes.

In the example of FIG. 1, there are two correct results of segment matching. Using the pattern query 100 illustrated in FIG. 1, the current LYNXeon platform may take 8.5 hrs to find the first result and 20 hours to find the second result in a test database.

Figure 2:
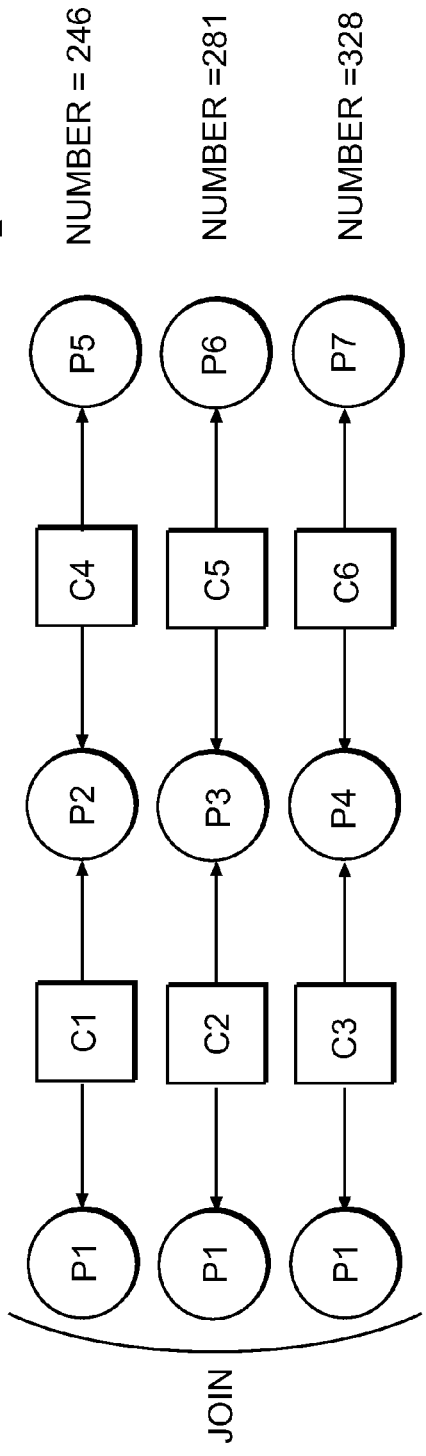
FIG. 2 illustrates an exemplary pattern query that has been deconstructed from the exemplary pattern query of FIG. 1 into subpattern queries.

An embodiment of the system and method for optimizing pattern query searches on a graph database may include a pattern query optimizer 64 (shown in FIG. 8) to optimize execution of the search plan for any sequence of SQL expressions. Specifically, the pattern query optimizer 64 (shown in FIG. 8) separates or breaks the pattern query 100 of FIG. 1 into multiple subpattern queries before converting the subpattern queries into SQL expressions. FIG. 2 illustrates a new pattern query 200 formed by decomposing (i.e., deconstructing) the pattern query 100 of FIG. 1 into three subpattern queries, each comprising a straight line path, and joining on the P1 node.

The following shows exemplary optimized SQL expressions that implement the search plan noted above that visits all the constrained nodes first.

```
select distinct
   pn1.number,
   pn2.number,
   pn4.number,
   pn6.number,
   pn3.number,
   pn5.number,
   pn7.number
from
   (select distinct c1From.destinationId as p1, c1To.destinationId as p2,
   c2To.destinationId as p5 from
      "VAST2008"."GNF_PhoneNumber" pn,
      "VAST2008"."GNF_PhoneCall_relations" c1To,
      "VAST2008"."GNF_PhoneCall_relations" c1From,
      "VAST2008"."GNF_PhoneCall_relations" c2To,
      "VAST2008"."GNF_PhoneCall_relations" c2From
   where
      pn.UID = c2To.destinationId and
      pn.number = 246 and
      c1To.relationshipId = 10 and
      c1From.relationshipId = 8 and
      c2To.relationshipId = 10 and
      c2from.relationshipId = 8 and
      c1To.sourceId = c1From.sourceId and
      c2To.sourceId = c2From.sourceId and
      c1To.destinationId = c2From.destinationId) as subquery1,
   (select distinct c1From.destinationId as p1, c1To.destinationId as p3,
   c2To.destinationId as p6 from
      "VAST2008"."GNF_PhoneNumber" pn,
      "VAST2008"."GNF_PhoneCall_relations" c1To,
      "VAST2008"."GNF_PhoneCall_relations" c1From,
      "VAST2008"."GNF_PhoneCall_relations" c2To,
      "VAST2008"."GNF_PhoneCall_relations" c2From
   where
      pn.UID = c2To.destinationId and
      pn.number = 281 and
      c1To.relationshipId = 10 and
      c1From.relationshipId = 8 and
      c2To.relationshipId = 10 and
      c2from.relationshipId = 8 and
      c1To.sourceId = c1From.sourceId and
      c2To.sourceId = c2From.sourceId and
      c1To.destinationId = c2From.destinationId) as subquery2,
   (select distinct c1From.destinationId as p1, c1To.destinationId as p4,
   c2To.destinationId as p7 from
      "VAST2008"."GNF_PhoneNumber" pn,
      "VAST2008"."GNF_PhoneCall_relations" c1To,
      "VAST2008"."GNF_PhoneCall_relations" c1From,
      "VAST2008"."GNF_PhoneCall_relations" c2To,
      "VAST2008"."GNF_PhoneCall_relations" c2From
   where
      pn.UID = c2To.destinationId and
      pn.number = 328 and
      c1To.relationshipId = 10 and
      c1From.relationshipId = 8 and
      c2To.relationshipId = 10 and
      c2from.relationshipId = 8 and
```

-continued

```
        c1To.sourceId = c1From.sourceId and
        c2To.sourceId = c2From.sourceId and
        c1To.destinationId = c2From.destinationId) as subquery3,
    "VAST2008"."GNF_PhoneNumber" pn1,
    "VAST2008"."GNF_PhoneNumber" pn2,
    "VAST2008"."GNF_PhoneNumber" pn3,
    "VAST2008"."GNF_PhoneNumber" pn4,
    "VAST2008"."GNF_PhoneNumber" pn5,
    "VAST2008"."GNF_PhoneNumber" pn6,
    "VAST2008"."GNF_PhoneNumber" pn7
where
    subquery1.p1 = subquery2.p1 and
    subquery2.p1 = subquery3.p1 and
    subquery1.p1 = pn1.UID and
    subquery1.p2 = pn2.UID and
    subquery2.p3 = pn3.UID and
    subquery3.p4 = pn4.UID and
    subquery1.p5 = pn5.UID and
    subquery2.p6 = pn6.UID and
    subquery3.p7 = pn7.UID;
```

Referring again to FIG. 1, three parallel branches exist with P1 as the root node. In FIG. 2, these branches are split and joined on P1. The notion of a segment (for segment matching) may be expanded to include the multiple nodes and edges that form a path. The subpattern queries shown in FIG. 2 minimize the number of nodes considered by ordering the search plan so that the constrained nodes (e.g., P5, P6, and P7) are visited first. The search order with respect to FIG. 2 is: {P5, C4, P2, C1, P1}, {P6, C5, P3, C2, P1}, {P7, C6, P4, C3, P1} where bracketed terms represent the subpatterns and can be searched for independently. The subpattern matches are then joined on the values for P1. In other words, matches to each subpattern that have the same P1 value can be combined into a match for the complete pattern. The search of the test database using the new pattern query 200 of FIG. 2 and the optimized SQL expressions shown above may find both correct answers in 140 msec, as opposed to more than 20 hours using the pattern query 100 of FIG. 1. In other words, the new pattern query 200 provides a significant speed improvement (over 600,000 times faster).

Figure 3:
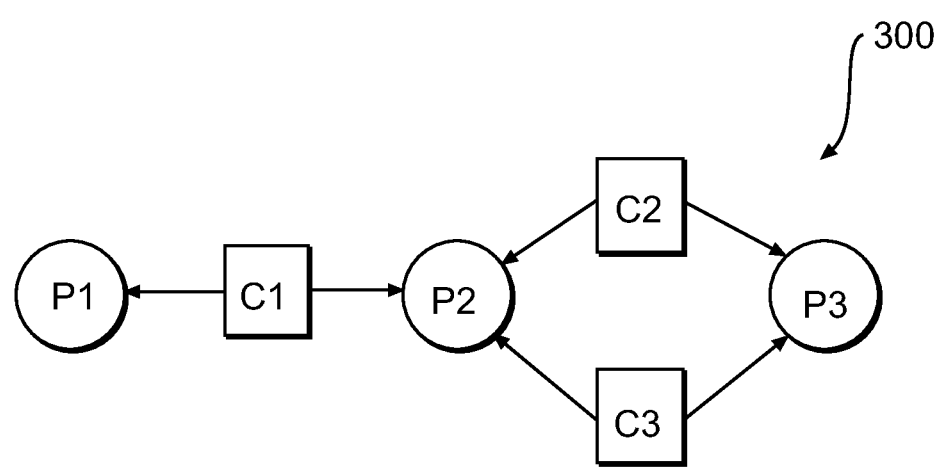
FIG. 3 illustrates an exemplary pattern query that includes branches and a cycle.

FIGS. 3-5 illustrate pattern queries and elements of an embodiment of a method for optimizing pattern query searches on a graph database that uses the pattern query optimizer 64 (show in FIG. 8) to algorithmically, without intervention by an analyst, decompose any pattern query into a set of subpattern queries by first identifying branches and cycles within a pattern query and then decomposing each identified branch and cycle into equivalent straight line paths, i.e., straight line nodes joined by edges. Illustrated here is an embodiment that operates on pattern queries expressed in PQL. Preferably the underlying graph is in graph normal form.

Figure 4A:
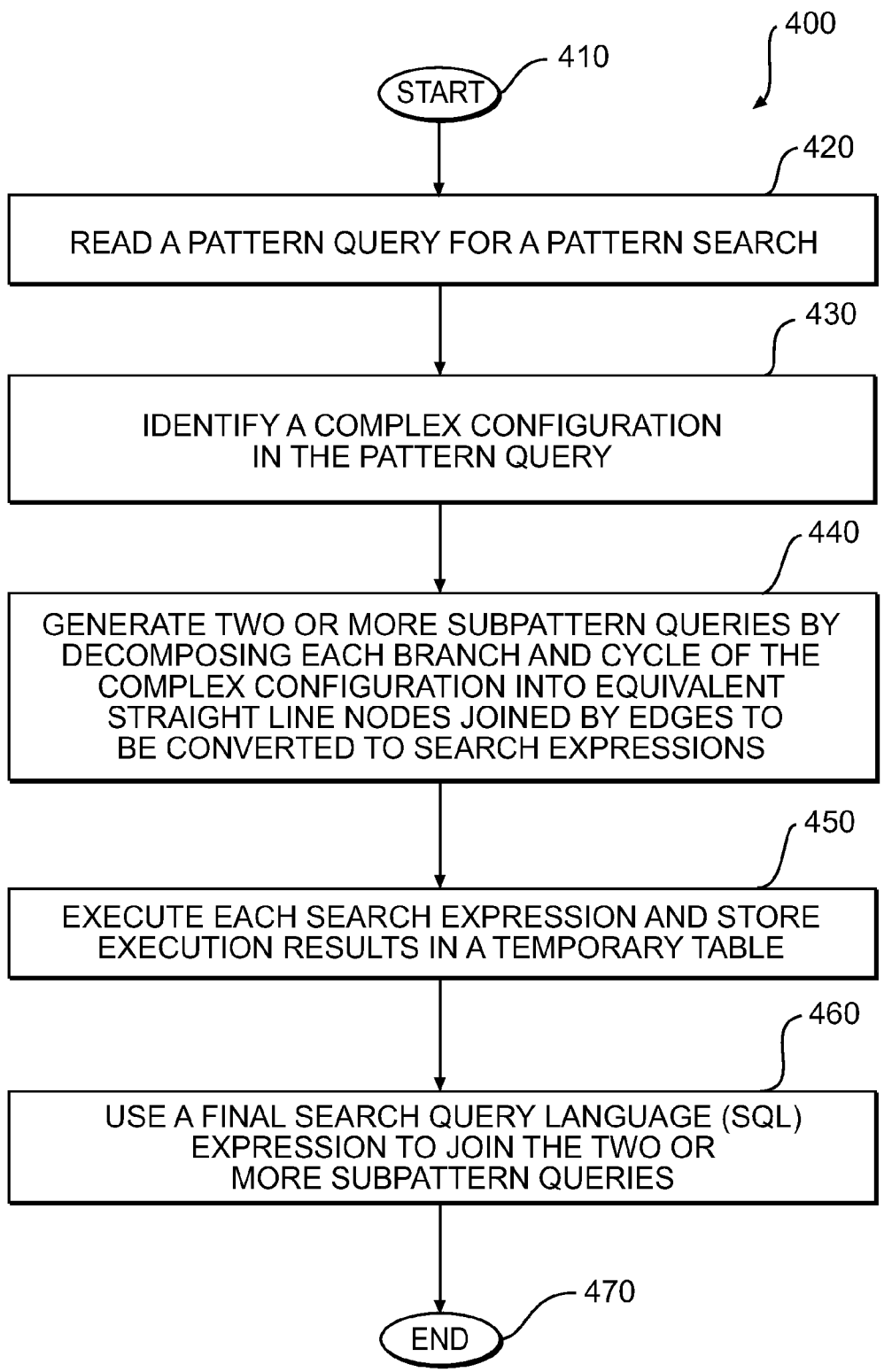
FIG. 4A is a flow chart illustrating an embodiment of a method for optimizing pattern query searches on a graph database.

Specifically, FIG. 3 illustrates an exemplary pattern query 300 that includes a branch (P1-C1-P2) and a cycle (P2-C2-P3-C3) joined at P2. FIG. 4A is a flow chart illustrating an embodiment of a method 400 for optimizing patent searches on a graph database. Method 400 starts (block 410) by reading a pattern query for a pattern search (block 420). Method 400 then identifies (block 430) a complex configuration in the pattern query. The complex configuration includes at least one branch or cycle. The method 400 then generates (block 440) two or more subpattern queries by decomposing each branch and cycle of the complex configuration into equivalent straight line nodes joined by edges to be converted to search expressions. See FIG. 2 for an example of the decomposing of the complex configuration of FIG. 1. Method 400 may optionally execute each search expression, e.g., perform a search using the search expression, and store the execution results in a temporary table (block 450). Method 400 may also optionally use a final SQL expression to join the two or more subpattern queries (block 460). Method 400 ends at block 470.

Figure 4B:
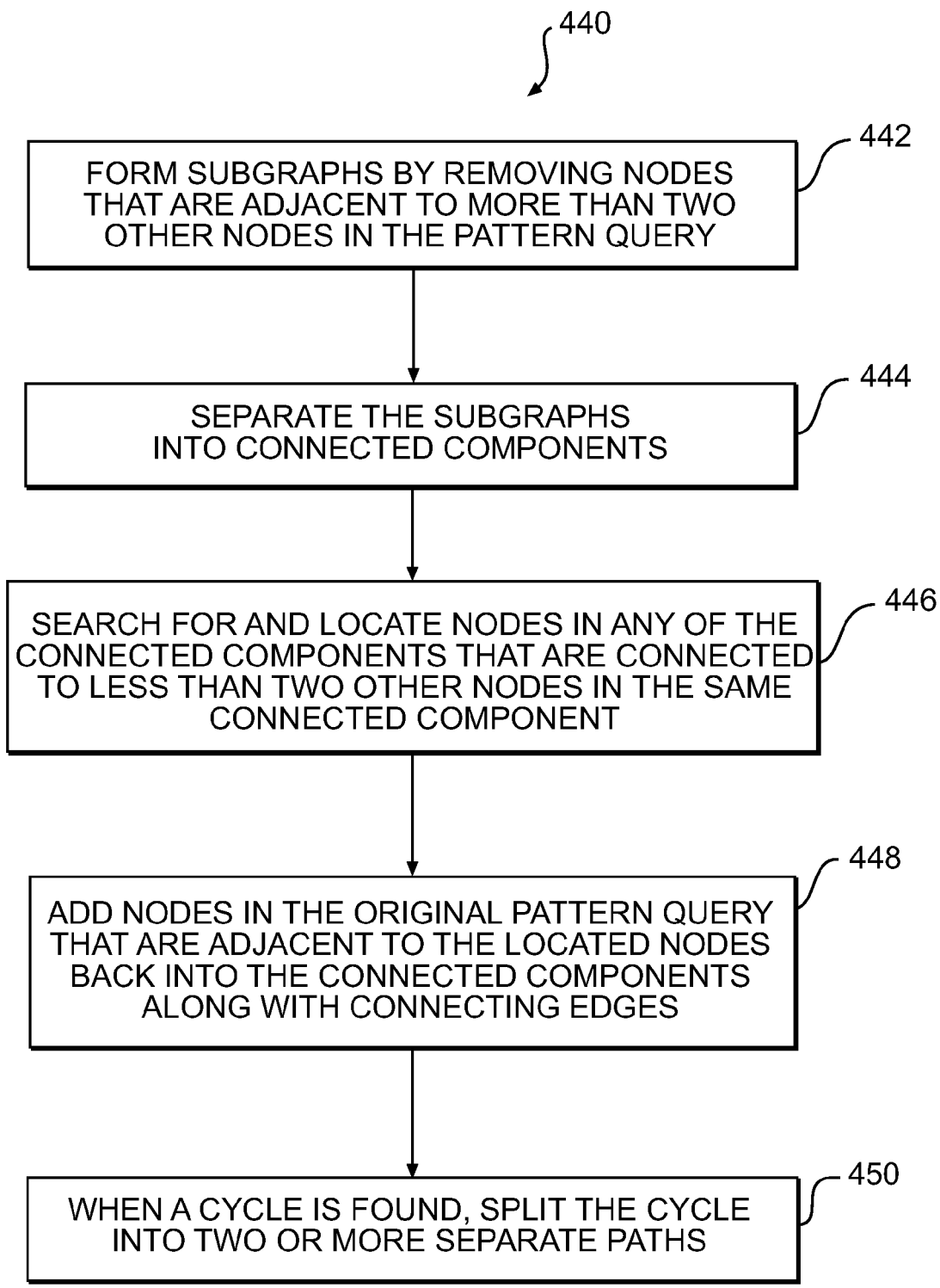
FIG. 4B is a flow chart illustrating an embodiment of the generating step of FIG. 4A that identifies branches and cycles within a pattern query and decomposes each identified branch and cycle into equivalent straight line paths.

FIG. 4B is a flow chart illustrating an embodiment of the generating step 440 of FIG. 4A that identifies branches and cycles within a pattern query and decomposes each identified branch and cycle into equivalent straight line paths. FIGS. 5A-5D illustrate how the exemplary pattern query 300 of FIG. 3 is decomposed according to the steps shown in FIG. 4B.

Referring to FIG. 4B, generating 440 may include several sub-elements.

Figure 5A:
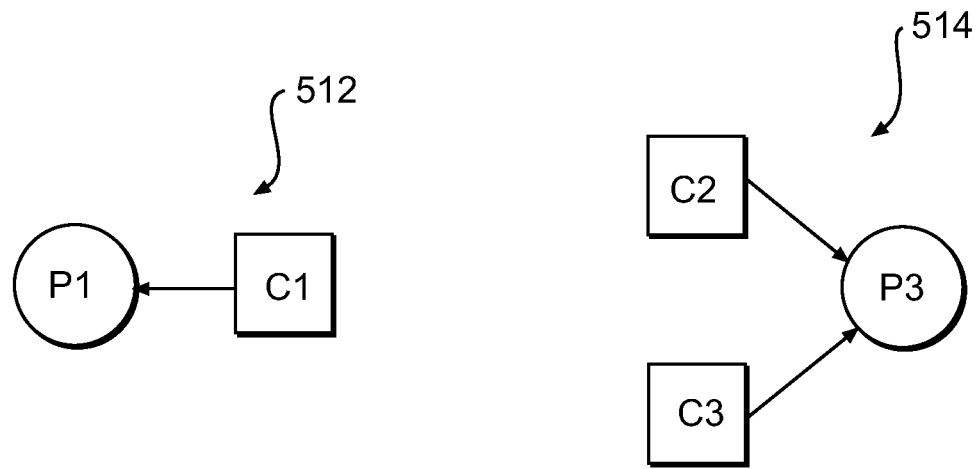
FIGS. 5A-5D illustrate how the exemplary pattern query of FIG. 3 is decomposed according to the steps shown in FIG. 4B.

In block 442 of FIG. 4B, method 400 forms subgraphs of the pattern query 300 by removing any nodes that are adjacent to more than two other nodes in the pattern query 300. As shown in FIG. 5A, subgraphs 512, 514 are formed by removing P2 from the pattern shown in FIG. 3. P2 is the node adjacent to more than two other nodes.

Figure 5B:
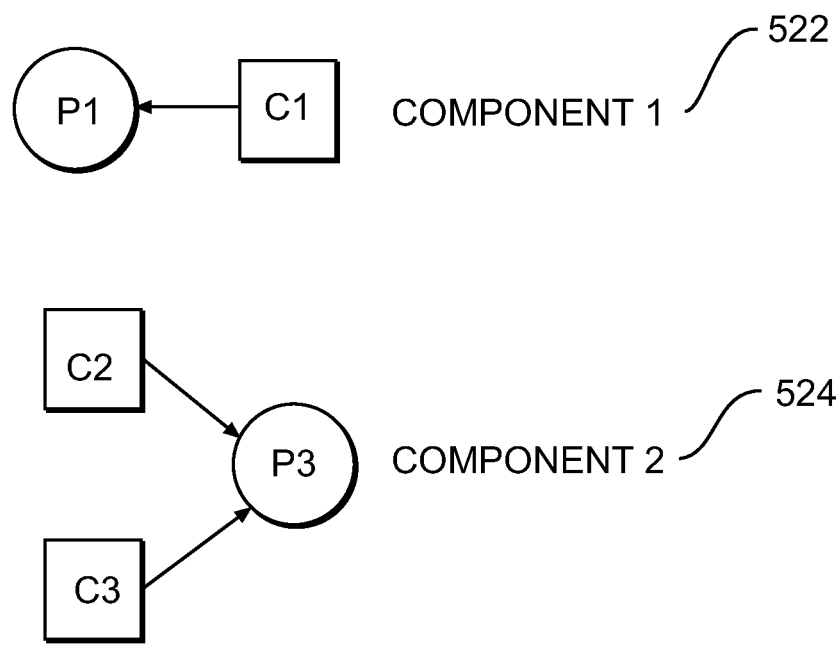

In block 444 of FIG. 4B, the subgraphs 512, 514 are separated into connected components. A connected component is a maximal subgraph that has no edges connecting it to other components. As shown in FIG. 5B, the subgraphs 512, 514 of FIG. 5A are separated into Component1 522 and Component2 524.

Figure 5C:
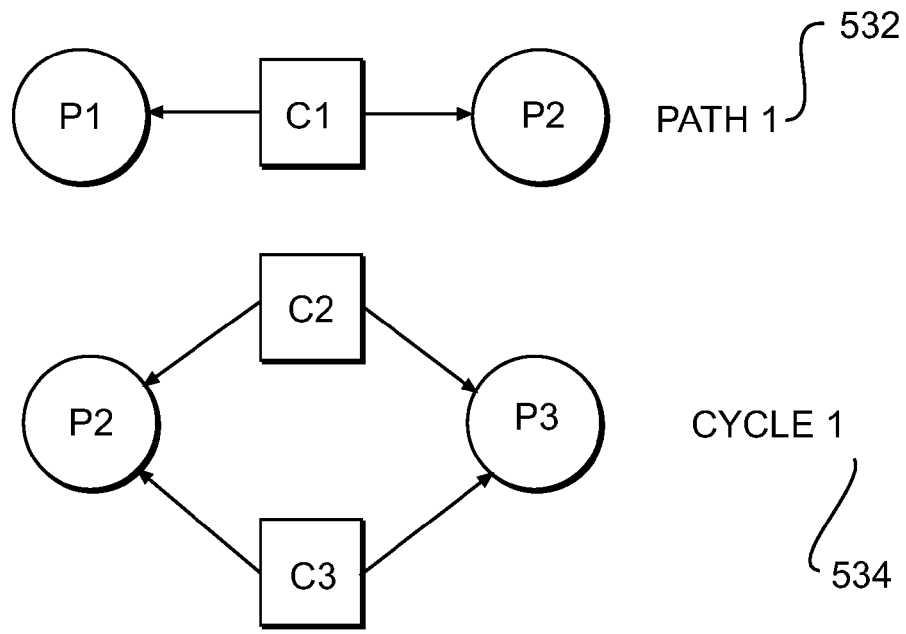

In block 446 of FIG. 4B, method 400 searches for and locates any nodes in any of the connected components that are connected to less than two other nodes in the same component. In block 448, any nodes in the original pattern query 300 that are adjacent to such nodes are then added along with any connecting edges into each of the connected components containing the nodes. Each connected component is now either a path or a cycle. As shown in FIG. 5C, P2 is the node in the original pattern query 300 of FIG. 3 that is adjacent to nodes that are connected to less than two other does in the same connected component. Referring again to FIG. 5C, P2 is added to the components 522, 524 of FIG. 5B along with connecting edges, forming Path1 532 and Cycle1 534.

Figure 5D:
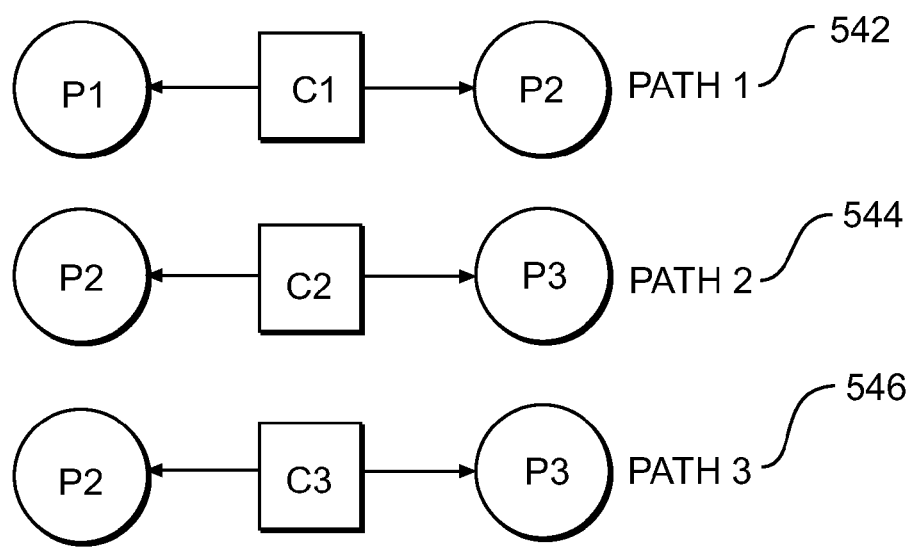

In block 450 of FIG. 4B, when a cycle is found, the cycle may be split into two or more separate paths. As shown in FIG. 5D, Cycle1 534 of FIG. 5C is split into Path2 544 and Path3 546. The pattern query optimizer 64 (shown in FIG. 8) may determine partitioning points to provide start and end nodes for parallel paths. Certain nodes may be partitioning points for such splits. Each node that is qualified may be used as a partition point for the split. Two partition points may be needed for a cycle to be split. If only one node is qualified then the antipode node on the cycle may be chosen as the second partition point. If no nodes are qualified, the cycle may be split in half arbitrarily. The partition point selection may include the following additional criteria:

1. The node is exported in the PQL statement. For example, the node type is identified as a result of the PQL statement.

2. The node is qualified by an attribute or value.

3. The node is included in a constraint expression

4. The paths formed by splitting at the node are structurally equivalent

The following pseudo-code shows an exemplary algorithm of identifying branches and cycles within a pattern query and decomposing each identified branch and cycle into equivalent straight line paths.

```
1 let P be the pattern graph
2 let N be the set of all nodes in P with an undirected degree ≤ 2
3 let G be the graph of formed by nodes in N and the edges in P between
   them
4 let C be the set of connected components in G
5 let B be the set of graphs where each graph in B contains exactly one
   component from C
5 // Expand end points on branches to include all neighbors
6 for each graph b in B:
7    for each node n in b:
8       if node degree n < 2 add all adjacent nodes and edges for n from P
         into b
9    end
10 end
11 let B_{n+1} be the graph containing all nodes n in P where n is not in any
   B_1...B_n
11 //each graph in B_1..B_n should either be a straight line or a cycle given
   their degree constraints
12 for each graph b in B:
13    if b forms a cycle (for example, if each node n in b is adjacent to
two other nodes n' and n" in b):
14       remove b from B
15       split b into two or more components c_1...c_n
16       // c_1...c_n will be a 'lines'
17       add components c_1...c_n into b
18    end
19 end
10 //each graph B contains only straight line paths and can be treated as an
   edge
```

After deconstruction of the pattern query into subpattern queries (block 440), each subpattern query may be converted (block 440) to an equivalent SQL expression that includes all exported, constrained, and joined nodes. The SQL expression for each subpattern query may be executed (e.g., by segment matching and searching for a match using the SQL expression) and the search results may be stored in a temporary table (block 450). A final SQL expression may be used to join the subpattern queries and save the exported nodes and values (block 460).

Figure 6:
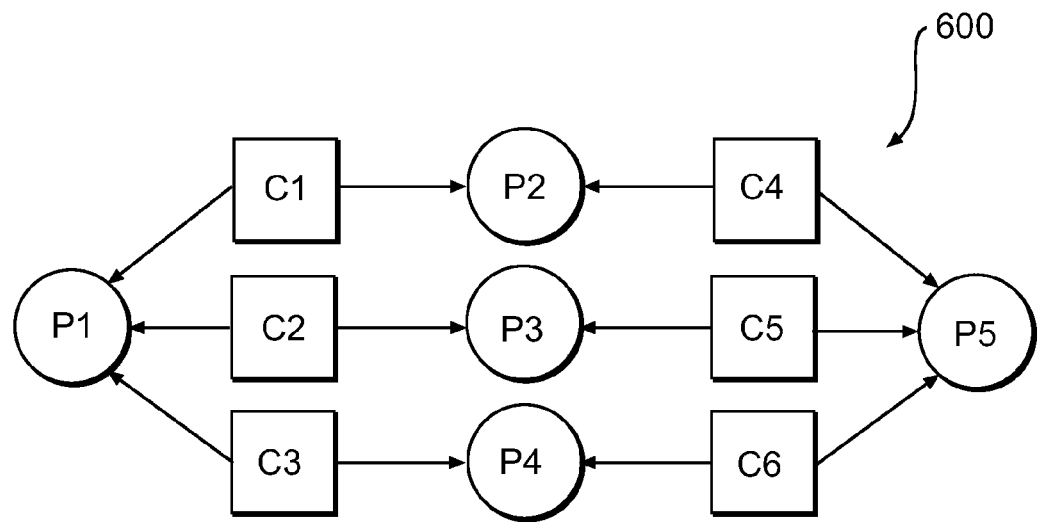
FIG. 6 illustrates another exemplary pattern query.
Figure 7:
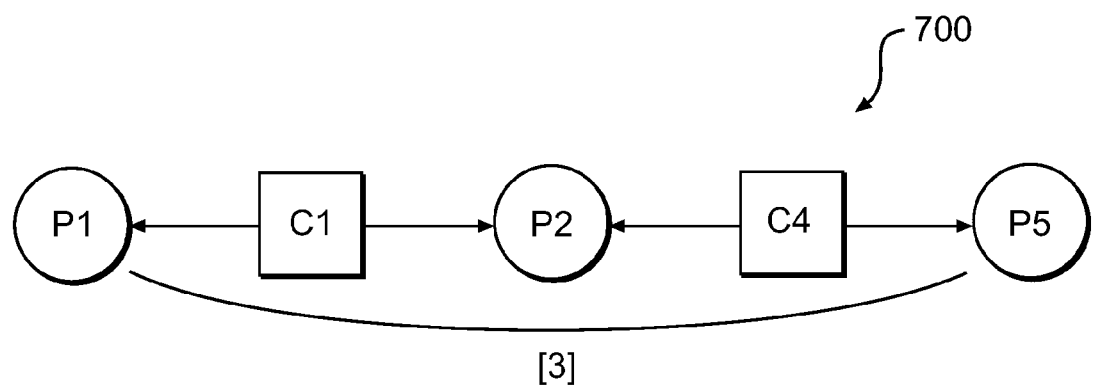
FIG. 7 illustrates exemplary subpattern queries of the exemplary pattern query of FIG. 6.

Cardinality may be used to improve the performance of pattern searches. FIGS. 6 and 7 illustrate an embodiment of the system and method for optimizing pattern query searches on a graph database using cardinality. Specifically, FIG. 6 illustrates another exemplary pattern query 600, and FIG. 7 illustrates an exemplary subpattern query 700 formed, e.g., by method 400 using cardinality, of the exemplary pattern query 600 of FIG. 6.

As shown above, a pattern query may be optimized by deconstructing branches and cycles into subpattern queries. As illustrated below, a pattern query may further be optimized by eliminating structurally-equivalent subpattern queries.

An embodiment of the system and method may automatically identify cardinality by identifying equivalent paths within a pattern. Specifically, an embodiment of the system and method may first sort the paths by end nodes (e.g., P1 and P5 in FIG. 7) and iterate through the paths to keep the paths that meet cardinality requirements. An embodiment of the system and method may reduce the number of SQL expressions that need be performed, because instead of an SQL expression for each structurally equivalent subpattern query, only one is needed that represents all of the subpattern queries.

For example, the pattern query 600 of paths in FIG. 6 may be reduced to a single pattern query 700 shown in FIG. 7, which is one of several equivalent subpattern queries for the paths in FIG. 6. Paths are considered equivalent if they meet the following set of criteria:

1. Paths have the same number of nodes
2. Nodes in the same position on the path are of the same type 3. Nodes in the same position on the path have the same qualifications 4. Only the start and end nodes are shared 5. None of the non-shared nodes between the paths are exported 6. Any shared node are shared with all paths in the same position 7. Have one shared node between all paths 8. Non-shared nodes in the paths are not used in PQL value or constraint expressions.

The following shows an exemplary expression of the pattern query 600 illustrated in FIG. 6 with the cardinality constraint.

```
search droppedPhone is
   instance p1 : PhoneNumber;
   instance p2 : PhoneNumber;
   instance p3 : PhoneNumber;
   instance p4 : PhoneNumber;
   instance p5 : PhoneNumber;
   instance c1 : PhoneCall;
   instance c2 : PhoneCall;
   instance c3 : PhoneCall;
   instance c4 : PhoneCall;
   instance c5 : PhoneCall;
   instance c6 : PhoneCall;
   connections
      c1.fromNumber connects p1;
      c1.toNumber connects p2;
      c2.fromNumber connects p1;
      c2.toNumber connects p3;
      c3.fromNumber connects p1;
      c3.toNumber connects p4;
      c4.fromNumber connects p2;
      c4.toNumber connects p5;
      c5.fromNumber connects p3;
      c5.toNumber connects p5;
      c6.fromNumber connects p4;
      c6.toNumber connects p5;
   end
   export
      p1;
      p5;
   end
end
```

The pattern described in FIG. 6 may also be manually restructured into the following PQL to explicitly declare cardinality for the paths connecting P1 to P3.

```
search pattern is
   search subpattern is
      cardinality 3 to *;
      instance p1 : P;
      instance c1 : C;
      instance p2 : P
      instance c2 : C;
      instance p3 : P;
      connections
         c1 to p1 via c1.from;
         c1 to p2 via c1.to;
         c2 to p2 via c2.from;
         c2 to p3 via c2.to;
      end
      export
         export c1;
         export c2;
      end
   end
```

```
        export
            p1 is subpattern.p1;
            p3 is subpattern.p3;
        end
    end
```

The following shows an exemplary expression of a pattern query that has been converted into SQL, e.g., the optimized SQL expression for the pattern query with the cardinality constraint.

```
SELECT
    c3_fromNumber_p1.destinationId AS p1,
    c6_toNumber_p5.destinationId AS p5
FROM
    --Relation Tables--
    "VAST2008"."GNF_PhoneCall_relations" c3_fromNumber_p1,
    "VAST2008"."GNF_PhoneCall_relations" c6_toNumber_p5,
    "VAST2008"."GNF_PhoneCall_relations" c6_fromNumber_p4,
    "VAST2008"."GNF_PhoneCall_relations" c3_toNumber_p4
WHERE
    --Edge Contraints--
    c3_fromNumber_p1.relationshipId = 8 AND
    c3_toNumber_p4.relationshipId = 10 AND
    c6_toNumber_p5.relationshipId = 10 AND
    c6_fromNumber_p4.relationshipId = 8 AND
    --Table Joins--
    c6_fromNumber_p4.destinationId = c3_toNumber_p4.destinationId
    AND
    c6_toNumber_p5.sourceId = c6_fromNumber_p4.sourceId AND
    c3_fromNumber_p1.sourceId = c3_toNumber_p4.sourceId
GROUP BY
    1,
    2
HAVING
    count(1) >= 3;
```

An embodiment of the system and method may also optimize pattern query searches on a graph database by joining nodes with attribute values that satisfy some nearness criteria. Nearness, also known as inferred edges, is the linking of two nodes whose attributes meet some nearness criteria. For example, two flights that take off within a certain amount of time as one another are considered linked. The naive approach compares every flight to every other flight that is $O(n^2)$ complexity for n flights.

Performance may be improved by joining nodes with attribute values that satisfy a nearness criteria of |(value 1-value2)|<=delta, i.e., values are within a certain delta from one another. An embodiment of the system and method may first sort the nodes by attribute values being considered, and then iterate over sorted nodes to link any contiguous nodes that meet the nearness criteria. This approach may reduce the complexity for numeric attributes to $O(n \log(n))$ or $O(n)$, depending on the sorting algorithm used.

Figure 8:
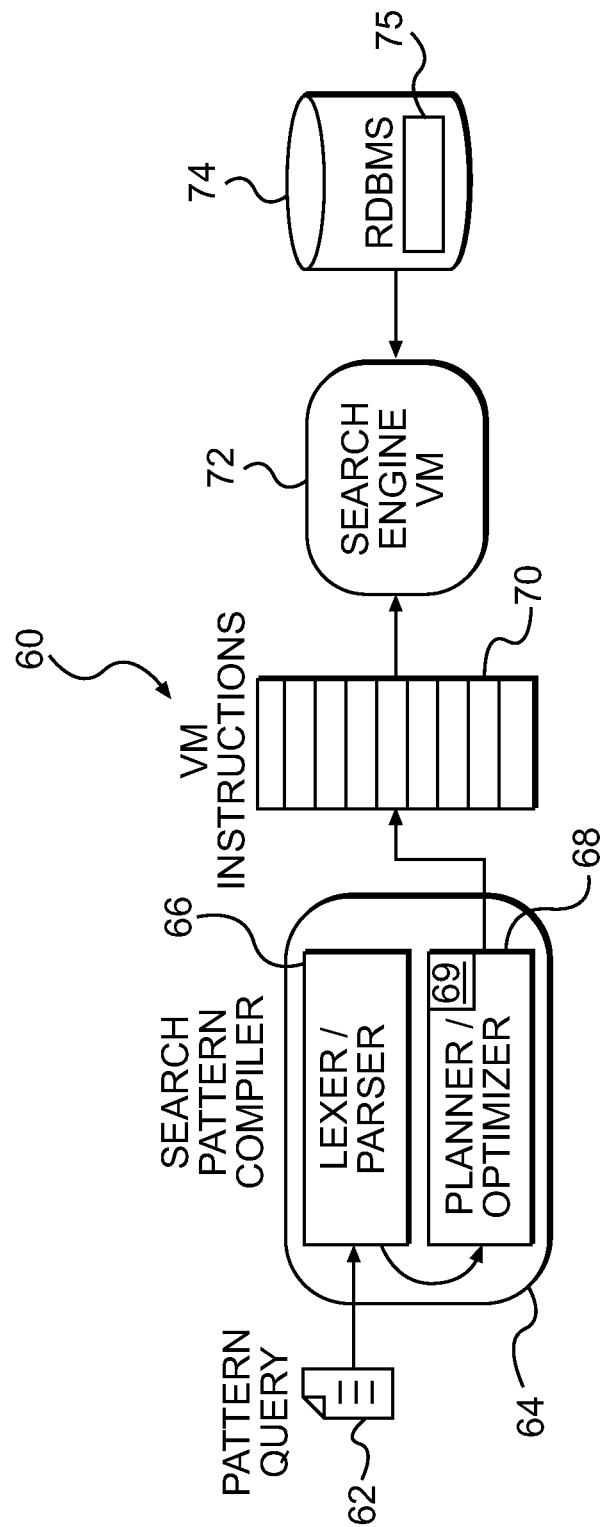
FIG. 8 illustrates an exemplary implementation of graph database search engine.

FIG. 8 is a block diagram of a graph database platform 60 in accordance with the system and method for optimizing pattern query searches on a graph database. The system and method use a combination of relational database technology and search technology based on graph matching concepts. The system and method may accept one or more pattern queries 62 (as described above) that is used to search a data set 75 implemented in a data storage system 74, such as a relational database management system (RDBMS) in which data is represented as a graph, e.g., in graph normal form. In an embodiment the RDBMS is PostgreSQL version 8.2. The pattern queries may be input into a search pattern compiler 64 that compiles the pattern queries into a search plan (i.e., a set of abstract instructions). In an embodiment the search plan may include one or more SQL expressions. In more detail, the search pattern compiler 64 may have a lexer/parser 66 and a planner/optimizer 68 through which each pattern query is routed and converted into a search plan. The lexer/parser 66 may parse out the pattern query to identify particular variables and aspects of each pattern query while the planner/optimizer 68 generates a search plan and then optimizes it. In an embodiment the planner/optimizer 68 further includes a pattern query optimizer 69 that executes the algorithms described herein for optimizing pattern query searches by, for example, removing cycles and converting branches into straight lines and identifying queries where cardinality can be used to reduce the number of search expressions. Then, the search plan is sent to a set of instructions 70 that are part of a search engine virtual machine 72. In an embodiment the search engine virtual machine 2 is provided by PostgreSQL version 8.2. The instructions perform the segment matching of the pattern to the data set (graphs) 75. A particular set of instructions contained in the search engine virtual machine are based on the search plan and graphs being searched. As shown in FIG. 8, the plan generation (that occurs in the search pattern compiler 64) is decoupled from search execution (carried out by the search engine virtual machine 72) so that the system and method can introduce many kinds of optimizations and correctness checks (during the planning process) that would otherwise be difficult to do in a pure graph algorithmic approach.

Figure 9:
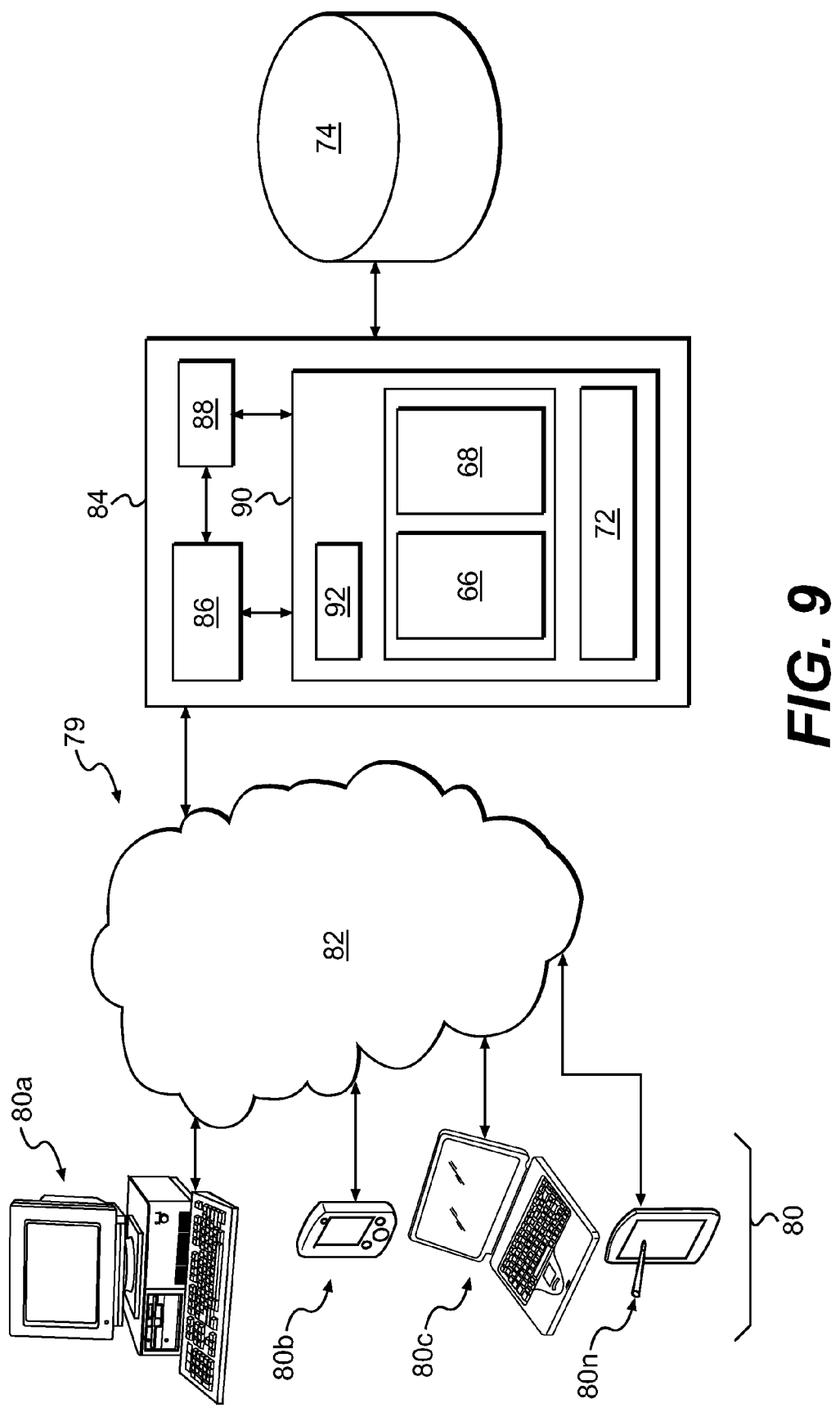
FIG. 9 illustrates an exemplary implementation of a computer system that implements an embodiment of a graph database search engine.

FIG. 9 illustrates an example of a computer system 79 that implements an embodiment of system and method for optimizing pattern query searches in a graph database. In the embodiment, the search system is implemented in software that is being executed by the computer system although other implementations are within the scope of the invention such as implementing all or part of the search system on a hardware device or a combination of hardware and software. In the example of FIG. 9, the search system is implemented in a stand-alone commercially-available desktop computer 84. However, the system may be implemented using other computer architectures (for example, a client/server type architecture, a mainframe system with terminals, an ASP model, a peer to peer model, and the like) and other networks (for example, a local area network, the internet, a telephone network, a wireless network, a mobile phone network, and the like), and those other implementations of the search system are within the scope of the invention since the invention is not limited to any particular computer architecture or network.

The exemplary system shown in FIG. 9 may have one or more devices 80, such as a desktop computer 80a, a PDA or handheld device 80b, a laptop computer 80c and a table computer 80n, that communicate in a client/server configuration over a network 82 with a main computer 84 acting as a server computer. The client devices may broadly be any device with sufficient computing power, memory and connectivity to be able to interact with the server to submit a set of pattern queries and receive search results from the search system. The main computer 84 may have one or more processing units 86, a persistent storage unit 88 and a memory 90 that stores the pieces of software being executed by the processing unit or units 86 of the main computer. To implement the search system, the memory may contain an operating system 92, the search pattern compiler 64 with its sub-modules 66, 68 and 69, and the search engine virtual machine 72, and the main computer may be coupled to the data storage system 74. Operating system 82 may host PostgreSQL version 8.2 and provides a Java Platform and Java Virtual Machine that supports Java version 1.5. In this exemplary implementation, the search pattern compiler 64 is a plurality of lines of Java computer code that implement the optimizing methods of the system as described herein. The parser 66, planner/optimizer 68 and pattern query optimizer 69 may also be expressed in a plurality of lines of Java computer code that implement the parsing, planning and optimizing, and pattern query optimizing instructions as well as other functions described herein.

Although the computer system 79 is shown with various components, one skilled in the art will appreciate that the computer system 79 can contain additional or different components. In addition, although aspects of an implementation consistent with the method optimizing pattern query searches on a graph database are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 79 to perform a particular method.

While the foregoing has been made with reference to a particular embodiment of the invention, it will be appreciated by those skilled in the art that changes in this embodiment may be made without departing from the principles and spirit of the invention.

What is claimed is:

1. A method for optimizing pattern query searches on a graph database, the method being implemented by a computer including at least one processor and comprising:
    providing a pattern search engine operative to generate a search plan on the graph database from a first pattern query, the pattern search engine being executed by the processor;
    identifying, by the at least one processor, in the first pattern query a first subpattern query and a second subpattern query that is structurally equivalent to the first subpattern query;
    wherein the first subpattern query and the second subpattern query each comprise a single path;
    wherein the structural equivalence meets criteria of:
        the paths have a same number of nodes;
        nodes in a same position on the paths are of a same type;
        nodes in a same position on the paths have same qualifications;
        only start and end nodes are shared;
        none of non-shared nodes between the paths are exported;
        any shared node is shared with both paths in a same position;
        having one shared node between both paths; and
        non-shared nodes in the paths are not used in pattern query language (PQL) value or constraint expressions; and
    reducing the number of search expressions in the search plan based on the structural equivalence between the first subpattern query and the second subpattern query.

2. The method of claim 1, wherein the graph database is implemented in a relational database management system (RDBMS).

3. The method of claim 1, wherein the pattern query comprises one or more branches.

4. The method of claim 1, wherein the pattern query comprises one or more cycles.

5. The method of claim 1, wherein the pattern query comprises one or more branches and one or more cycles.

6. The method of claim 1, wherein the first subpattern query and the second subpattern query are each straight line nodes joined by edges.

7. The method of claim 1, wherein the reduction of the number of search expressions in the search plan is converted into a single search query language (SQL) expression.

8. The method of claim 1, wherein the first subpattern query and the second subpattern query each comprise a single path.

9. The method of claim 8, wherein the structural equivalence meets a criteria of the paths having a same number of nodes.

10. The method of claim 8, wherein the structural equivalence meets a criteria of nodes in a same position on the paths are of a same type.

11. The method of claim 8, wherein the structural equivalence meets a criteria of nodes in a same position on the paths have same qualifications.

12. The method of claim 8, wherein the structural equivalence meets a criteria of only start and end nodes are shared.

13. The method of claim 8, wherein the structural equivalence meets a criteria of none of non-shared nodes between the paths are exported.

14. The method of claim 8, wherein the structural equivalence meets a criteria of any shared node is shared with both paths in the same position.

15. The method of claim 8, wherein the structural equivalence meets a criteria of having one shared node between both paths.

16. The method of claim 8, wherein the structural equivalence meets a criteria of non-shared nodes in the paths are not used in pattern query language (PQL) value or constraint expressions.

* * * * *